P. HENNIG.
GYROSCOPE STEERING GEAR.
APPLICATION FILED MAR. 28, 1912.

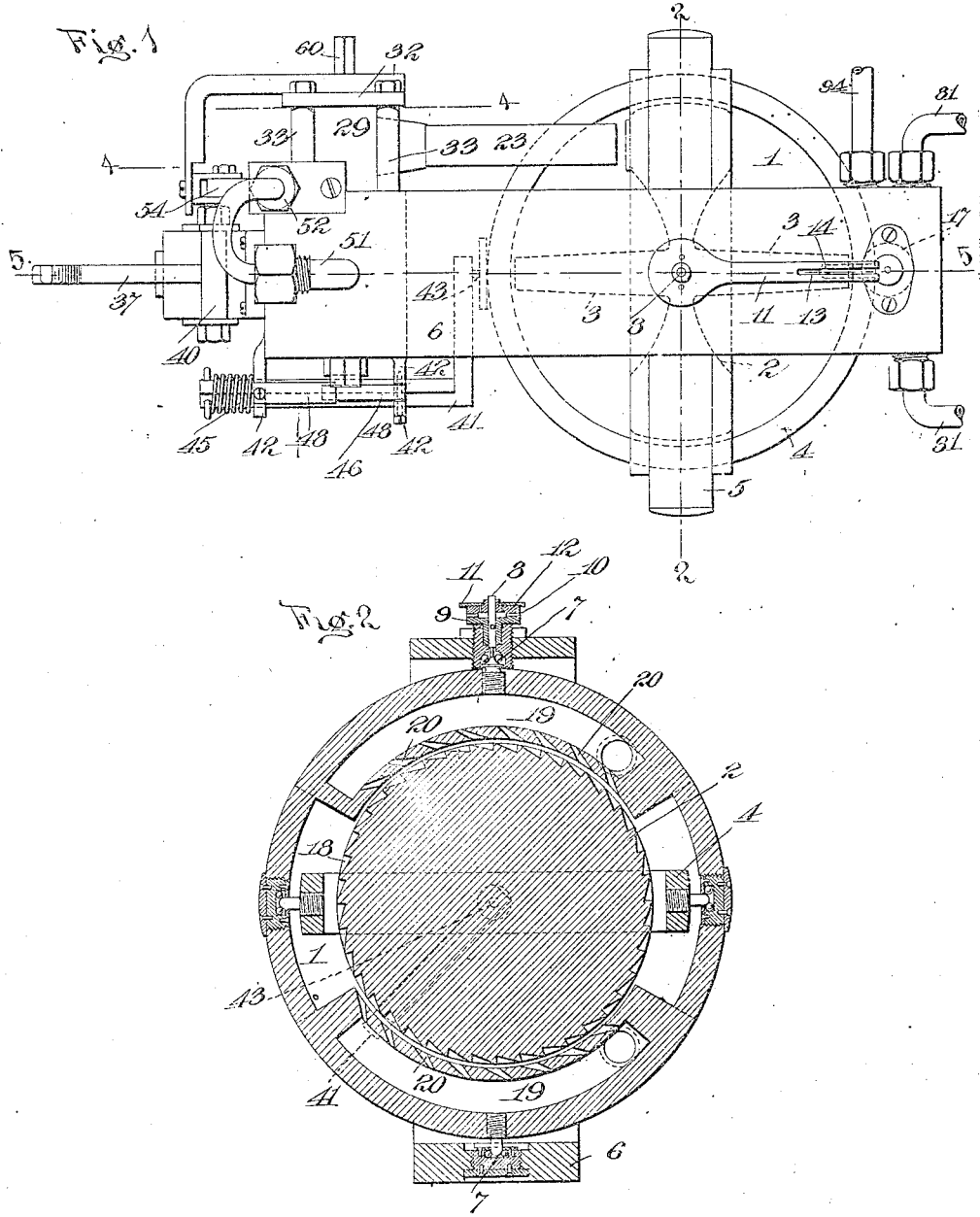

1,077,344.

Patented Nov. 4, 1913.
5 SHEETS—SHEET 2.

Witnesses:
John L. Lotsch
Geo. J. Hanson

Inventor
Paul Hennig
By W. Dyr Taylor
Attorneys.

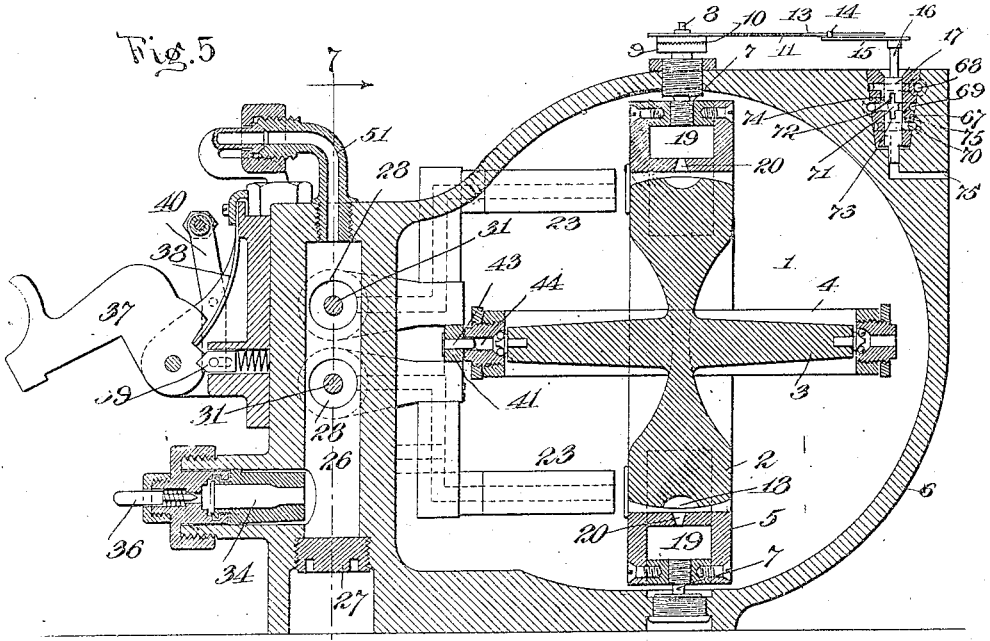
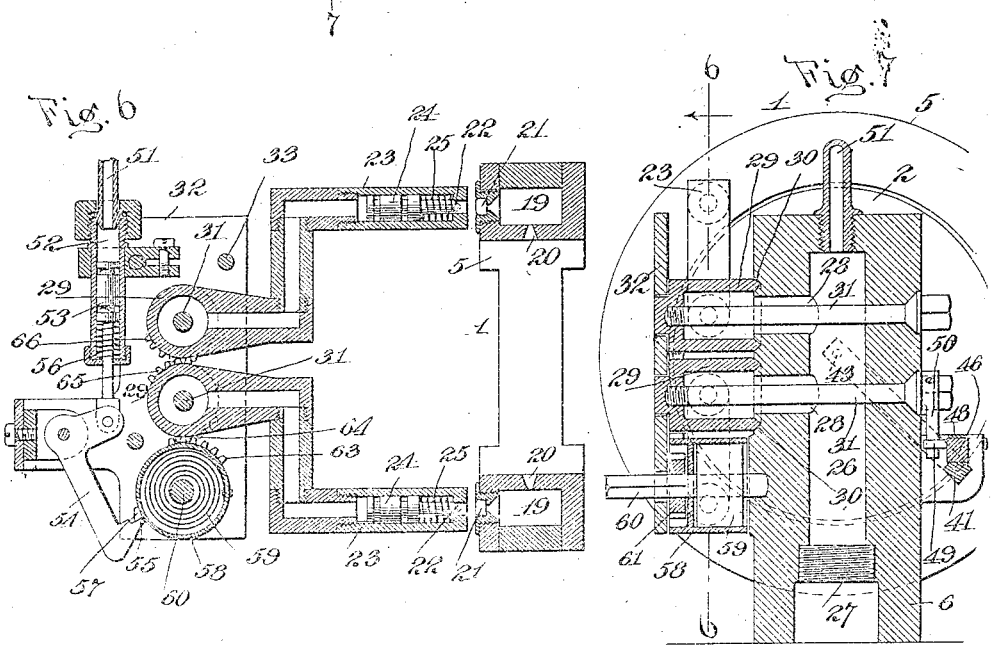

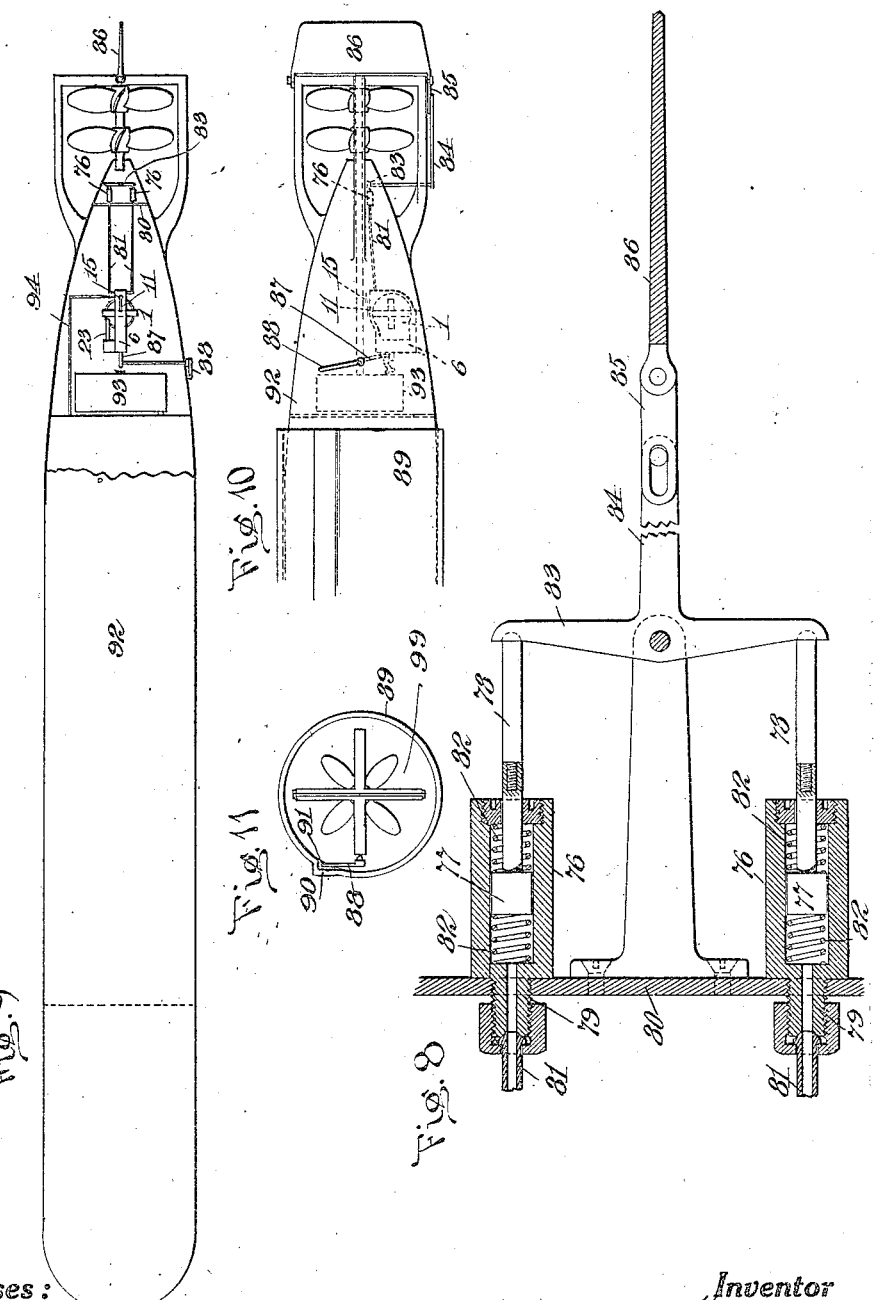

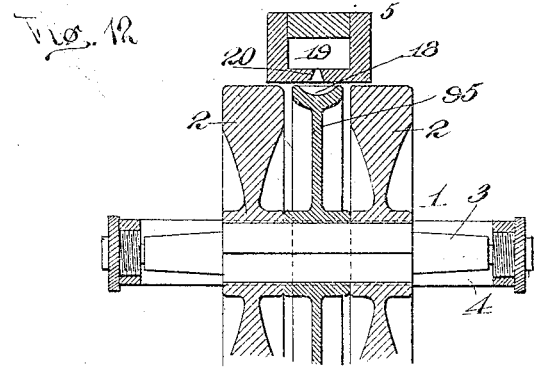
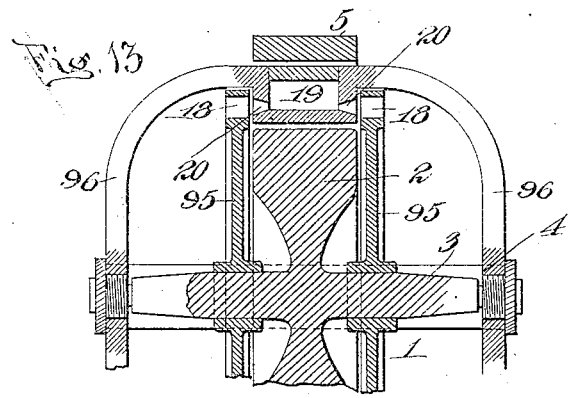
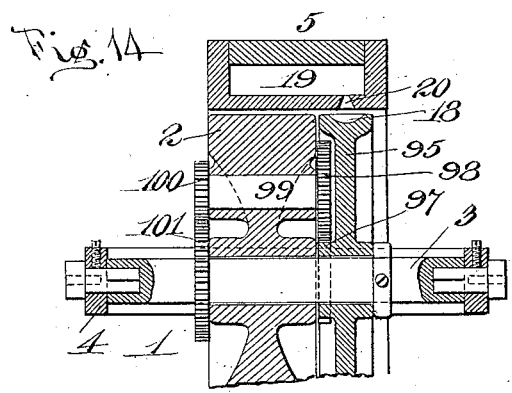

UNITED STATES PATENT OFFICE.

PAUL HENNIG, OF NEW YORK, N. Y.

GYROSCOPE STEERING-GEAR.

1,077,344.  Specification of Letters Patent.  Patented Nov. 4, 1913.

Application filed March 28, 1912. Serial No. 686,957.

*To all whom it may concern:*

Be it known that I, PAUL HENNIG, a subject of the King of Saxony, residing at No. 79 Saratoga avenue, borough of Brooklyn, county of Kings, city and State of New York, have invented a certain new and useful Gyroscope Steering-Gear, of which the following is a specification.

This invention relates to steering gears for vehicles, and has particular application for use in dirigible torpedoes, although its use is not so limited.

The objects I have in view are to form an absolutely accurate steering gear, in which the gyroscope will be put in rotation and the gimbal rings will be unlocked instantly after starting, so that the torpedo will not be deflected from its course owing to any hesitancy in the operation of the starting and unlocking devices.

A further object is to produce a structure in which the gyroscope can be made very heavy, and which, at the same time, may be quickly started.

Further objects are to provide a connection between the gyroscope and the rudder or steerer, by means of which the minimum quantity of elastic fluid is utilized in actuating the rudder.

These and further objects will more fully appear from the following specification and accompanying drawings, considered together or separately.

Figure 3:
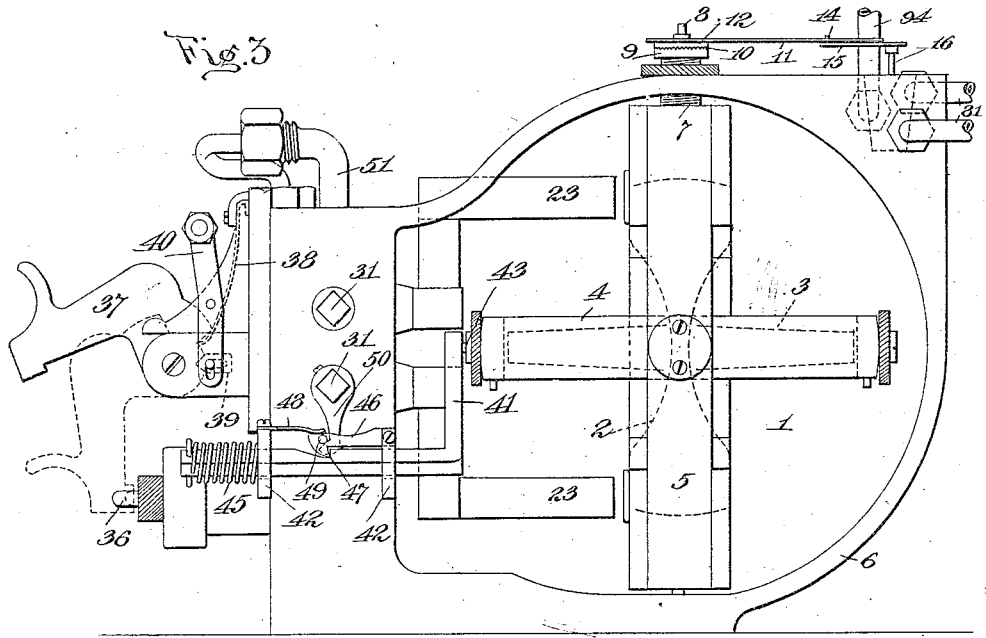
Figure 4:
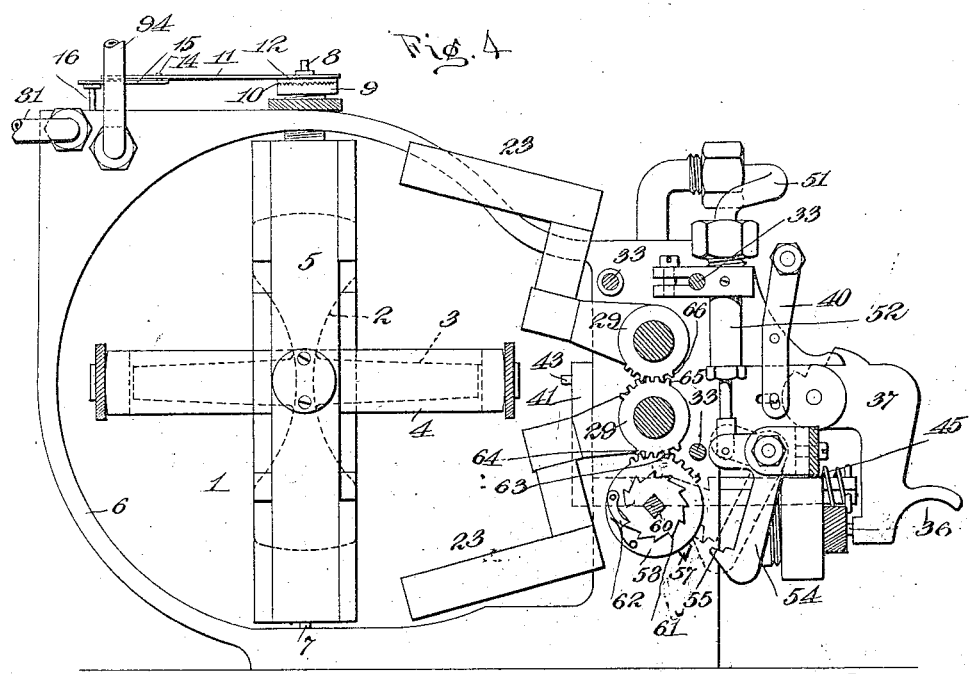

In the drawings, Figure 1 is a plan view of part of a steering apparatus embodying my invention. Fig. 2 is a section on the line 2—2 of Fig. 1. Fig. 3 is a side elevation of the same, looking at the left side of the apparatus and showing the gyroscope locked. Fig. 4 is a side elevation, looking at the right side of the apparatus, showing the gyroscope unlocked, this elevation being partly in section, the section being taken on the line 4—4 of Fig. 1. Fig. 5 is a longitudinal section of the apparatus, taken on the line 5—5 of Fig. 1. Fig. 6 is a longitudinal section on the line 6—6 of Fig. 7. Fig. 7 is a cross section on the line 7—7 of Fig. 5. Fig. 8 is a detail sectional view of the steering engines and rudder connections. Fig. 9 is a plan view, parts being broken away, of a dirigible torpedo equipped with my apparatus. Fig. 10 is a side elevation of a part of a torpedo, showing a portion of the discharge tube, Fig. 11 is a rear elevation of the parts shown in Fig. 10, and Figs. 12, 13 and 14 are modifications.

In all of the views, like parts are designated by the same reference characters.

I have illustrated and will describe my invention as applied to a device for steering a dirigible marine torpedo, but it is apparent that with obvious modifications it may be used for controlling any other vehicle, whether marine, terrestrial, or aerial.

Referring more particularly to Figs. 1 to 7, inclusive, which illustrate the gyroscope and the valve for controlling the admission of elastic fluid to the engines, 1 represents the gyroscope which comprises a rotor 2, mounted upon a shaft 3, in suitable bearings in the inner gimbal ring 4, the inner gimbal ring 4 being mounted in suitable bearings in the outer gimbal ring 5. The bearings (best shown in Figs. 2 and 5) are preferably ball bearings. The gyroscope is mounted in a frame 6. Suitable bearings 7 connect the gyroscope to the frame 6. One of the bearings, in the embodiment of the invention chosen for illustration,—the upper bearing—is provided with a stem 8, which extends above the frame 6. This stem is provided with a hub 9, connected to the stem so as to turn with the latter. The upper surface of the hub is provided with teeth 10, shown in Fig. 3. Loosely mounted on the stem 8 is a lever 11, which is provided with a hub 12, having teeth corresponding to the teeth 10, before described. This hub is adapted to rest upon the before-described hub 9, and the teeth of the two hubs engaging, will lock the lever 11 in relation to the stem 8. The free end of the lever 11 is provided with a slot 13, which is engaged by a pin 14 carried by a lever 15. This lever 15 is carried by the stem 16 of a valve 17, best shown in Fig. 5. This valve controls the admission of elastic fluid to the steering engine, as will be described.

For the purpose of starting and rotating the rotor of the gyroscope, I provide novel mechanism consisting of an elastic fluid turbine actuated by an expanding gas. I prefer to combine the rotor of the turbine with the rotor of the gyroscope, and I prefer to generate the gas from the combustion of gun powder or some other substance in a confined chamber, allowing it to escape through nozzles directed against the blades or buckets of the rotor of the turbine.

Referring to Fig. 2, the periphery of the rotor is provided with blades or buckets 18, which are preferably made in the form of notches, best shown in Fig. 5. The outer gimbal ring 5 is provided with one or more chambers 19, two being illustrated in Fig. 2, these chambers being opposite to each other. The inner walls of the chambers are in close proximity to, and curved from, a center coincident with the center of the rotor. The inner wall of each chamber is provided with one or more nozzles 20. These nozzles, as shown, are preferably expansion nozzles so as to increase the velocity of the escaping gas. They are directed in such a manner that the gas escaping from the nozzles will impinge against the blades or buckets 18 of the rotor and tend to rotate it. It is apparent that, if the chambers be filled with a quantity of gas-producing substance such as black powder, and this substance be ignited, it will burn, generating a gas which will escape through the nozzles, and this gas impinging against the buckets of the rotor will drive the latter and impart the necessary motion to the rotating element of the gyroscope. It is also apparent that, after the gas is exhausted, the gyroscope will, by its momentum, be free to rotate and will continue to do so for a sufficiently long time, to steer the vehicle during its passage or flight.

In order to burn the gas-producing substance in the chambers, I provide a device which will automatically ignite it, and this device I prefer to combine with a device which locks or latches the gimbal rings of the gyroscope, so that it (the gyroscope) is held rigidly in position before and during the ignition of the gas-producing substance, and will be unlocked immediately thereafter. This device is best shown in Figs. 3 to 7, inclusive.

For the purpose of firing the gas-producing substance, I provide igniters 21. These igniters, as shown in Fig. 6, are in the form of percussion caps, but it is apparent that any other form of igniter may be employed. The igniters are exploded by means of firing pins 22, carried in arms 23. Each arm is hollow, and near its extremity is provided with a piston 24, which is connected to and actuates the firing pin. A small spring 25, normally keeps the firing pin out of contact from the cap 21. The arms 23 are pivotally mounted so that they can be brought into such a position that the pins 22, driven forward by the pistons 24, will strike the caps and explode them, and they are also capable of being turned upon their pivots so as to be drawn back to allow the gimbal rings free axial movement. Each arm (best shown in Fig. 6) is tubular and is supported on the frame 6 so that it may be moved out of the range of movement of the gimbal ring. The pistons 24 are adapted to drive the firing pins against the caps by the explosion of gunpowder or some other substance within a chamber 26, best shown in Figs. 5 and 7. This chamber is located in the frame 6. It is provided with a closing cap 27. Suitable passages 28 communicate with the arms 23. In order to allow the arms to pivot, the structure illustrated in Fig. 7 is employed. The base of each arm is in the form of a barrel 29, connected, by a ground joint 30, to the side of the frame 6 concentric with one of the passages 28. Each barrel is held in position by means of a bolt 31, which passes through one wall of the frame opposite to the passage 28, extends through the passage, and is threaded into the end of the barrel 29. The projecting ends of the bolts 31 are made non-circular, for the reception of a wrench for the purpose of turning the arms 23 to bring them into proper position for firing. One end of the barrel is provided with a reduced portion, by means of which it is supported upon a plate 32, by engaging within a suitable opening therein. This plate 32 is secured to the frame 6 of the machine by means of the supports 33, best shown in Figs. 1 and 4.

For the purpose of exploding the charge of powder contained in the chamber 26, I may employ a cartridge 34, located in a suitable block, as shown in Fig. 5, and exploded by means of a firing pin 36. This pin is actuated by means of a hammer 37, which is moved by means of a spring 38 and held in cocked position by means of a dog 39. This dog is released by means of a trigger 40, actuated by any suitable device, preferably by an automatically actuated lever, as will be described. If desired, the trigger may be actuated by means of a lanyard attached thereto. It is apparent that upon the trigger 40 being pulled, the hammer will be released, striking the firing pin and exploding the cartridge 34, and igniting the contents of the chamber 26. The gas evolved by the burning of this powder in the chamber will pass through the arms 23, and the pressure of the gas will drive the pistons 24 forward, exploding the caps 21 by means of the firing pins 22.

The gimbal rings are locked in position up to and slightly beyond the time of explosion of the caps, by means of the following mechanism: (This mechanism is best shown in Figs. 1, 3 and 5.) A bolt 41, mounted in guides 42 upon the sides of the frame 6, has on one extremity a pin 43 (see Fig. 5). This pin is adapted to enter an opening 44 in the inner gimbal ring coincident with the bearing of the rotor shaft, and will lock the ring in position. The bolt is adapted to be withdrawn by means of a spring 45 (see Fig. 3) and is held against withdrawal by means of a latch 46. This latch 46 engages with a notch 47 on the bolt 41, and is held against said notch by means of a spring 48. The latch carries a pin 49, which is adapted to be engaged by a lever 50. This lever 50 is carried by one of the bolts 31, before described, (see Fig. 7). It is apparent that when the arms 23 turn upon their axes, they will turn the bolts 31, and one of these, through the agency of the lever 50, will disengage the latch 46 from the notch 47 and allow the spring 45 to withdraw the bolt from engagement with the gimbal ring, as shown in Fig. 4. The mechanism for accomplishing this is as follows:—A pipe 51 is connected to the chamber 26, and communicates with a cylinder 52, (see Fig. 6). In this cylinder is a piston 53, which is connected to a bell crank lever 54 having a hooked extremity 55. A spring 56 normally elevates the piston 53 and holds the hook 55 in engagement with a stop 57 which is carried upon a spring barrel 58. Within this spring barrel 58 is a spring 59. The barrel is mounted upon a shaft 60, having a non-circular extremity for the attachment of a key so that the spring may be wound. The shaft is provided with a ratchet 61, which engages with a pawl 62, (see Fig. 4) and permits the spring to be held in wound condition. Gear teeth 63 are formed upon the barrel 58, and these gear teeth engage with gear teeth 64 on the lowermost barrel 29. Other gear teeth 65 on the lowermost barrel 29 engage with corresponding gear teeth 66 in the upper barrel 29. It is apparent that, with the parts shown in Fig. 6, the spring 59 being under tension and the stop 57 engaging with the hook 55, the arms 23 will be in the position with the firing pins 22 in line with the caps 21, as shown. When the powder in the chamber 26 is exploded, the gas will pass out through the pipe 51 and, entering the cylinder 52, depress the piston 53. This will turn the bell crank lever 54 upon its axis and disengage the hook 55 from the stop 57. The spring 59 will then be free to rotate the barrel 58, and the teeth 63 on the latter, engaging with the teeth 64 on the lowermost barrel 29, will turn the lowermost arm 23 backward so that its free extremity will be drawn away from the gimbal ring, (see Fig. 4). The engagement of the teeth 65 with the teeth 66 on the lowermost barrel will draw the upper arm 23 backward to the same extent. These arms will be drawn back until they strike the frame 6, and when drawn back they will be entirely out of the range of movement of the gimbal ring. At this moment, when the arms are being rotated it is apparent that, through the rotation of the lowermost bolt 31, the lever 50 will spring the latch 46 in the manner already described.

From the foregoing description it is apparent that as soon as the trigger releases the hammer and the powder is ignited in the chamber 26, the expansion of the gas created by the explosive will cause the pins 22 to explode the caps 21, igniting the powder in the gimbal ring 5 and starting the rotation of the rotor of the gyroscope, and that immediately thereafter and practically instantaneously with this, the two arms 23 will be drawn back away from the gimbal ring, and the lock, consisting of the bolt 41 and pin 43, will be withdrawn from contact with the inner gimbal ring 4, so that the ring will be free to move in an angular direction, relative to the movement of the frame. It is apparent that, as soon as the caps 21 are exploded, the powder in the chambers 19, 19 will burn, and gas will be evolved and escape through the nozzles 20 as long as the powder continues to burn, and that this will occur while the gimbal rings are unlocked and when the gyroscope is free to act as such. The device, therefore, in addition to being absolutely positive, is extremely rapid in its action, the gyroscope being started and unlocked in a small fraction of a second after the trigger is actuated.

It is apparent that the locking device holds the gimbal rings rigidly in position so that the blows of the firing pins against the caps 21 will not derange the position of the gimbal rings in relation to the frame. It is also apparent that as these firing pins are actuated, by the direct action of the powder upon the cylinders which support them, while the lock is actuated by the various mechanical devices, the lock always will be disengaged from the inner gimbal ring slightly after the firing pins have come in contact with and exploded the caps. The gyroscope will, therefore, always be locked up to the time when the caps are exploded, but will be unlocked immediately after,—never before they are exploded.

The connections between the valve 17 and the steering engine will now be described: The valve 17 illustrated in Fig. 5, is a well known type of valve. It comprises a bushing 67, in which the valve 17 turns. This bushing 67 is provided with an upper groove 68, which, in the embodiment illustrated, is connected to the starboard steering engine. It is provided with a centrally located groove 69, which, in the embodiment chosen for illustration, is connected to the air supply and is also provided with a lower groove 70, which, in the embodiment chosen for illustration, is connected to the port steering engine. The valve is provided with a circumferential groove 71, and two vertical slots 72 and 73. The uppermost groove, 68, is provided with a vertical slot 74, extending downward, and the lowermost groove, 70, is provided with a slot 75, extending upward. These two slots 74 and 75, shown in Fig. 5, are located on opposite sides of the bushing and in such a position as to be within the path of the slots 72 and 73, respectively.

It is apparent that air under pressure will enter the groove 69, and when the valve is in the position illustrated, will be retained therein. This is the position in which neither steering engine is actuated. Should, however, the valve stem be turned by the action of the gyroscope so that the slot 72 comes in contact with the slot 74, then a free passage will be produced for the air supply, through the passage 68 to the starboard steering engine. Should the valve be turned in the opposite direction, a free passage to the port steering engine will be provided. The valve has an outlet 75ª for the escape of the air.

The steering engines, as shown in Fig. 8, each comprises a cylinder 76, with a piston working therein. The piston 77 carries a piston rod 78. Each cylinder is provided with a threaded extension 79, by means of which it is attached to a bulkhead 80. A suitable union connects each cylinder to a pipe 81, the pipes being connected to the passages or grooves 68 or 70, respectively, before described. The rods 78 are made in two parts, as shown, so that they can be separated when the engine is put in the torpedo. On each side of the piston 77 is a spring 82, these springs being so arranged that the piston is centered in substantially the longitudinal center portion of the cylinder. The free ends of the piston rods engage with a yoke 83, which is provided with a lever 84, which, in turn, is connected to the tiller 85 of a rudder 86. The springs 82, 82, also serve to center the rudder so that when the valve 17 is in the intermediate position and when no air enters the engines, the rudder will be amidships.

It is apparent that, as air is admitted to one or the other of the steering engines, the piston of that engine will be driven backward, turning the yoke 83 and driving the piston on the opposite engine forward against the tension of one of the springs 82. This produces a very simple device, and it uses a very small quantity of elastic fluid. The lever 13 on the gyroscope, may be adjusted in angular position upon the stem 8, before the torpedo is discharged. Should the torpedo deviate from the designated course, it is apparent that the frame and torpedo will turn in relation to the gyroscope, turning the valve 17. This will admit elastic fluid into one or the other of the steering engines, as determined by the connections, moving the rudder sharply to one side and bringing the torpedo back to its original course. This utilizes, therefore, a very small quantity of elastic fluid.

For the purpose of actuating the trigger when the torpedo is discharged, I provide a lever 87, located adjacent to the trigger, and this lever is actuated by another lever 88, extending through the shell of the torpedo. The discharge tube 89 is provided with a longitudinal recess 90, and this recess terminates at a certain definite point 91, so that as the torpedo passes through the tube, the lever 88 will come in contact with the end 91 of the recess, and be drawn backward. This movement will throw the lever 87 and pull the trigger.

In Fig. 9, an ordinary torpedo is illustrated, containing a supply tank 92, for elastic fluid, such as compressed air, and having a propelling engine 93 (shown diagrammatically). 94 illustrates the tube connecting the tank 92 to the valve 17. The lever 88 controls the valve (not shown) for communication from the air tank 92 to the propelling engine 93 in the usual manner, so that the actuating devices for the gyroscope are put in motion the moment that the propelling engine is put into communication with the air tank, and started.

Figs. 12, 13 and 14 represent modifications of the gyroscope rotor and the means for rotating the same. In these modifications, the turbine element, instead of being a part of the gyroscope rotor, as has been described, is in the form of a separate element.

In Fig. 12, the buckets 18, instead of being directly carried upon the gyroscope rotor 2, are carried upon a separate rotor 95. This latter rotor (which has the function of a turbine rotor), is connected to the shaft 3. To produce a symmetrical structure, I prefer to employ two gyroscope rotors, 2, 2, as shown,—one located on each side of the turbine rotor 95.

Fig. 13 illustrates a modification in which two turbine rotors are used, and for purposes of producing a symmetrical structure and to balance the stresses caused by the impact of the gas against the buckets 18, one rotor is placed on each side of the gyroscope rotor. The buckets 18, in this modification, are so formed as to be acted upon by gases which travel parallel to the axis of the rotors. Suitable buckets for this purpose may be made like those disclosed in the patent of De Lavel No. 522,066. In this embodiment of the invention, the chamber 19, instead of being carried by the outer gimbal ring 5, is supported upon the inner ring 4, by means of arms 96. This structure is advantageous, as the relative position of the buckets 18 and nozzles 20 do not change when the axes of the gyroscope and of the rings change, as they are free to do after the locking means is released.

Fig. 14 illustrates a still further modification, in which the gyroscope rotor 2 and the turbine rotor 95 turn at different speeds, the two being connected together by suitable gearing. The rotor 95 is loose upon the shaft 3, which, in this modification, does not rotate. A spur gear 97 carried by and rotated with the rotor 95 engages with a spur gear 98 carried by and turning a shaft 99. This latter shaft rotates in a bearing carried by the gyroscope rotor 2. It carries on the end opposite the gear 98, a second gear 100, which engages with a gear 101, fixed to the shaft 3. The gears 98 and 100 are of different diameters, consequently, the rotor 95 will turn the rotor 2 at different speed from which it itself turns. The gear 98 is shown as larger than the gear 100, hence the rotor 2 will turn at a slower speed than the rotor 95,—a construction which will permit the heavier rotor 2 to be more readily started in rotation.

From the foregoing description it is apparent that the turbine element may be a part of the gyroscope rotor, (e. g.—may consist of buckets carried by such rotors), or it may be a separate element (e. g., may be a separate rotor).

In accordance with the provisions of the patent statutes, I have described the principle of my invention, together with the apparatus which I now consider to represent the best embodiment thereof; but I desire to have it understood that the apparatus shown is merely illustrative, and that the invention can be carried out in other ways.

Having now described my invention, what I claim as new and desire to secure by Letters Patent, is:—

1. A gyroscope steering gear having a rotor, a gimbal ring carrying the rotor, a second gimbal ring, and gas generating means carried by the latter ring, for rotating the rotor.

2. A gyroscope steering gear having a rotor, a gimbal ring carrying the rotor, a second gimbal ring, and gas generating means carried by the latter ring and co-acting with the rotor, for rotating the latter.

3. A gyroscope steering gear having a gyroscope wheel, forming a turbine rotor, an inner gimbal ring carrying the rotor, and a gas generator having nozzles which co-operate with the rotor, said gas generator being carried by an outer gimbal ring.

4. A gyroscope steering gear having a turbine stator comprising a gimbal ring, a chamber carried thereby for generating gas, nozzles communicating with the chamber, a turbine rotor and gyroscope wheel located within a second gimbal ring, the nozzles being directed against the rotor.

5. A gyroscope steering gear having a gimbal ring, a chamber for generating gas, carried thereby, nozzles communicating with the chamber, a gyroscope wheel carried by a second gimbal ring and having buckets on the wheel against which the gas is directed from the nozzles.

6. A gyroscope steering gear having an inner gimbal ring, a rotor within the ring, means carried by an outer gimbal ring, for rotating the rotor, a lock for the inner ring, and means for releasing the lock and putting in action the rotor actuating means.

7. A gyroscope steering gear, having a gimbal ring, a chamber carried thereby, a turbine element rotating within the gimbal ring, a gyroscope wheel carrying the turbine element, nozzles communicating with the interior of the chamber and directed against the turbine element, a device for igniting an explosive within the chamber, and means independent of the gimbal ring, for actuating the exploding device.

8. A gyroscopic steering gear having a gyroscope, comprising a rotor and inner and outer gimbal rings, gas generating means carried by the outer ring, for rotating the rotor, and means outside of the rings, for putting the first named means into action.

9. A gyroscopic steering gear having a turbine rotor, a gimbal ring carrying the rotor, a turbine stator having two oppositely arranged chambers, nozzles directed against the rotor, and means for generating gas within the two chambers substantially simultaneously and directing the same against the rotor, so that the stresses on the bearings of the rotor, caused by the impact of the gas against the rotor, will be balanced.

10. A gyroscopic steering gear having a gyroscope wheel, buckets on the periphery thereof, gimbal rings for supporting the same, a chamber adapted to contain a gas-producing substance carried by one of the rings, nozzles communicating with the interior of the chamber and adapted to direct the gas against the buckets, an igniter communicating with the interior of the chamber, and a hammer carried outside of the gimbal ring and adapted to come in contact with the igniter to explode the same.

11. A gyroscope steering gear, comprising a gyroscope, gas generating means within the gyroscope, for rotating the rotor, means outside of the gyroscope, for putting the first named means into action, and a latch engaging with the gyroscope, holding the same rigidly in position, said latch and said outside means being connected together so that the latch operates after the said outside means operates.

12. A gyroscope steering gear having a rotor and gimbal rings, a gas-generating chamber carried by one of the rings, means caused by the generation of gas in the chamber for rotating the rotor of the gyroscope, a latch engaging with one of the rings and holding it immovable, means for initiating the production of gas in the chamber, a second chamber, and means for generating gas within the same, said means coöperating with the latch and with the gas initiation device so that the latch is actuated after the operation of the gas initiation device.

13. A gyroscope steering gear having a frame, a chamber carried thereby, said chamber being adapted to contain a gas-producing substance, a pivoted arm connected to the frame, said arm being hollow and communicating with the chamber, a piston thereon carrying a firing pin, in combination with a gimbal ring, a chamber carried thereby and adapted to contain a gas generating substance, an igniter communicating with the chamber and adapted to be exploded by the firing pin, nozzles communicating with the chamber, and buckets on the rotor.

14. A gyroscope steering gear having a frame, a chamber carried thereby, said chamber being adapted to contain a gas-producing substance, two pivoted arms connected to the frame, said arms being hollow and communicating with the chamber, pistons therein carrying firing pins, in combination with a gimbal ring, chambers carried thereby and adapted to contain a gas generating substance, igniters communicating with the chambers and adapted to be exploded by the firing pins, nozzles communicating with the chambers, and buckets on the rotor.

15. A gyroscope steering gear comprising a frame, a chamber carried thereby, a pivoted arm having its interior communicating with the chamber, a firing pin adapted to be actuated by the generation of gas within the chamber, a device for moving the arm out of the path of the gimbal ring, and a latch normally holding the said device inoperative and means operated to trip the latch by the generation of gas within the chamber, in combination with a gimbal ring, and means actuated by the firing pin, for generating power therein to rotate the rotor of the gyroscope.

16. A gyroscope steering gear having a frame, a chamber therein adapted to contain a gas-producing substance, a hollow arm normally mounted in the frame with its extremities adjacent to the gimbal ring, a piston working within the arms, a firing pin actuated by the piston, a gimbal ring, a chamber on the gimbal ring, adapted to contain a gas-producing substance, an igniter for said chamber, said igniter being located in the path of the firing pin, nozzles communicating with the interior of the chamber, a rotor, carrying buckets and adapted to be acted upon by the gases passing through the nozzles, means adapted to normally hold the arm with the firing pin in position to explode the igniter, a piston communicating with the first named chamber, and a latch actuated by the movement of the piston whereby, when gas is generated in the first named chamber, the firing pin will be driven against the igniter and the latch will be released, drawing the arm back out of the path of the gimbal ring so that the latter may swing freely.

17. A gyroscope steering gear having a frame, a chamber therein adapted to contain a gas-producing substance, two hollow arms movably mounted in the frame with their extremities adjacent to the gimbal ring, pistons working within the arms, firing pins actuated by the pistons, a gimbal ring, chambers on opposite sides thereof, adapted to contain a gas-producing substance, igniters for said chamber, said igniters being located in the path of the firing pins, nozzles communicating with the interior of the chambers, a rotor carrying buckets adapted to be acted upon by the gases passing through the nozzles, means adapted to normally hold the arms with the firing pins in position to explode the igniters, a piston communicating with the first named chamber, and a latch actuated by the movement of the piston whereby, when gas is generated in the first named chamber, the firing pins will be driven against the igniters, and the latch will be released, drawing the arms back out of the way of the gimbal ring so that the latter may swing freely.

18. A gyroscope steering gear comprising a frame, a chamber, adapted to contain a substance to generate gas, a hollow arm pivotally mounted in the frame and communicating with the chamber, a piston in the arm, a firing pin connected to the piston, a spring engaging with the arm and adapted to swing the said arm out of its normal position, a lock for holding the arm normally in position so that the firing pin is adjacent to an igniter, a piston connected to the lock and communicating with the chamber, a latch adapted to engage with one of the gimbal rings and lock the same, a spring normally tending to release the latch, a trigger holding the latch in locked position, said trigger being actuated by the movement of the arm, in combination with a gimbal ring, a chamber therein adapted to contain a material for generating gas, an igniter lying within the path of the firing pin, nozzles communicating with the interior of the chamber, and a rotor element within the path of the nozzle and adapted to be actuated by the gases issuing therefrom.

19. A gyroscope steering gear comprising a frame and gimbal rings, a chamber, adapted to contain a substance to generate gas, two hollow arms pivotally mounted in the frame and communicating with the chamber, pistons in the arms, firing pins connected to the pistons, a spring engaging with the arms and adapted to swing the said arms out of the path of the gimbal rings, a lock for holding the arms normally in position so that the firing pins are adjacent to igniting devices, a piston connected to the lock and communicating with the chamber, a latch adapted to engage with one of the gimbal rings and lock the same, a spring normally tending to release the latch, a trigger holding the latch in locked position, said trigger being actuated by the movement of one of the arms, chambers carried by a gimbal ring adapted to contain a material for generating a gas, igniters lying within the path of the firing pins, nozzles communicating with the interior of the chambers, and a rotor within the path of the nozzles and adapted to be actuated by the gases issuing therefrom.

20. A gyroscope steering gear having a gyroscope, a steering device such as a rudder, springs for holding the rudder in intermediate position, two pistons connected with the rudder,—one for moving it in one direction, and the other for moving it in the other direction,—a source of air under pressure, and a valve, said valve being controlled by the position of the gyroscope to admit air under pressure against one or the other of the pistons, to hold the latter in deflected position until the vehicle is brought back to the normal position.

This specification signed and witnessed this 27th day of March, 1912.

PAUL HENNIG.

Witnesses:
 JOHN L. LOTSCH,
 GEORGE J. HANSON.